United States Patent
Berger et al.

(10) Patent No.: US 9,619,452 B2
(45) Date of Patent: Apr. 11, 2017

(54) PASTING A SET OF CELLS

(75) Inventors: Peter Glen Berger, Irwin, PA (US);
Jay Christopher Capela, Santa Cruz, CA (US); Yaniv Gur, Pittsburgh, PA (US); Roger Rock Rosner, Mountain View, CA (US); Peter Su, Pittsburgh, PA (US); Christopher Douglas Weeldreyer, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 1157 days.

(21) Appl. No.: 13/093,778

(22) Filed: Apr. 25, 2011

(65) Prior Publication Data
US 2011/0202823 A1    Aug. 18, 2011

Related U.S. Application Data

(63) Continuation of application No. 11/890,652, filed on Aug. 6, 2007, now Pat. No. 7,954,047.

(51) Int. Cl.
*G06F 17/24* (2006.01)

(52) U.S. Cl.
CPC .................................. *G06F 17/246* (2013.01)

(58) Field of Classification Search
CPC .. G06F 3/0481; G06F 17/2247; G06F 3/0482; G06F 17/218; G06F 17/24; G06F 3/04842; G06F 9/4443; G06F 9/543; G06F 17/211; G06F 17/2229; G06F 17/227; G06F 17/272; G06F 17/30569; G06F 17/30651; G06F 17/3089; G06F 3/0483; G06F 3/04845; G06F 3/0486; G06F 17/30722; G06T 11/206; G06T 3/40

USPC ......................................... 715/212, 220, 217
See application file for complete search history.

(56) References Cited

U.S. PATENT DOCUMENTS

| | | | | |
|---|---|---|---|---|
| 5,463,724 A | * | 10/1995 | Anderson et al. | 715/209 |
| 5,572,644 A | * | 11/1996 | Liaw et al. | 715/209 |
| 5,581,678 A | * | 12/1996 | Kahn | 345/440 |
| 5,995,918 A | * | 11/1999 | Kendall et al. | 704/1 |
| 6,240,430 B1 | * | 5/2001 | Deike et al. | 715/210 |
| 6,369,836 B1 | * | 4/2002 | Larson et al. | 715/763 |
| 6,948,154 B1 | * | 9/2005 | Rothermel et al. | 717/128 |
| 7,017,118 B1 | * | 3/2006 | Carroll | 715/770 |
| 7,237,188 B1 | * | 6/2007 | Leung | 715/209 |
| 7,689,928 B1 | * | 3/2010 | Gilra | 715/787 |
| 2003/0145051 A1 | * | 7/2003 | Bates et al. | 709/204 |
| 2007/0094619 A1 | * | 4/2007 | Shirai | 715/860 |
| 2007/0294632 A1 | * | 12/2007 | Toyama et al. | 715/764 |

OTHER PUBLICATIONS

Quattro Pro 9, Copyright © 1999, Corel Corporation and Corel Corporation Limited.*
MacDonald, Matthew; Excel 2003 for Starters: The Missing Manual; Publisher: O'Reilly Media, Inc.; Pub. Date: Oct. 31, 2005.*

* cited by examiner

*Primary Examiner* — Nathan Hillery
(74) *Attorney, Agent, or Firm* — Fletcher Yoder PC

(57) ABSTRACT

Pasting a set of cells is disclosed. In some embodiments, a selection of an option to paste a set of cells in a paste destination is received; and in response to determining that the paste destination is not large enough to accommodate a paste operation associated with the selected option, the paste destination is automatically expanded so that the paste destination is large enough to accommodate the paste operation.

17 Claims, 9 Drawing Sheets

|    | A | B | C |
|----|---|---|---|
| 1  | Red | Green | Brown |
| 2  | Orange | Blue | Black |
| 3  | Yellow | Purple | White |
| 4  |   |   |   |
| 5  |   |   |   |
| 6  |   |   |   |
| 7  |   |   |   |
| 8  |   | Cut |   |
| 9  |   | Copy |   |
| 10 |   | Paste |   |

FIG. 1C

|    | A | B | C |
|----|---|---|---|
| 1  |   | Green | Brown |
| 2  | Orange |   | Black |
| 3  | Yellow | Purple |   |
| 4  |   |   |   |
| 5  |   |   |   |
| 6  |   |   |   |
| 7  | Red |   |   |
| 8  |   | Blue |   |
| 9  |   |   | White |
| 10 |   |   |   |

FIG. 1D

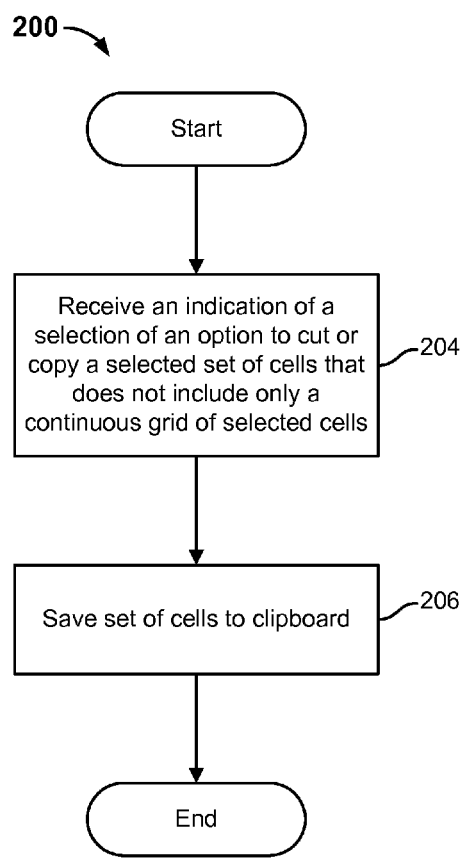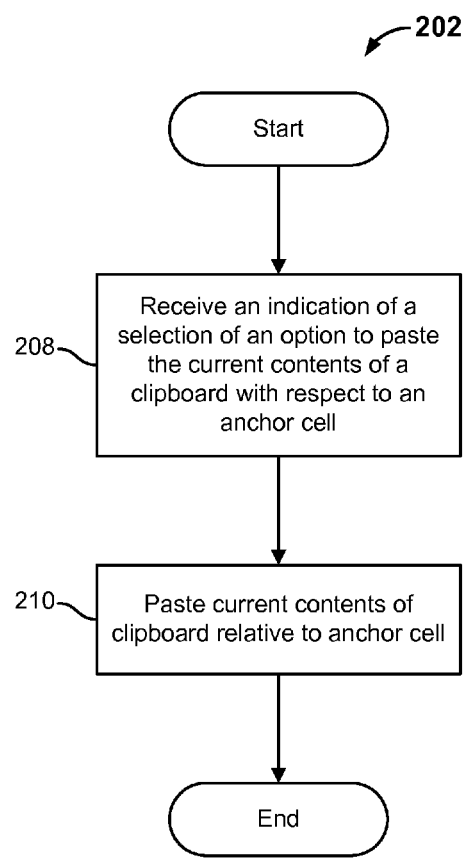
FIG. 2A
FIG. 2B

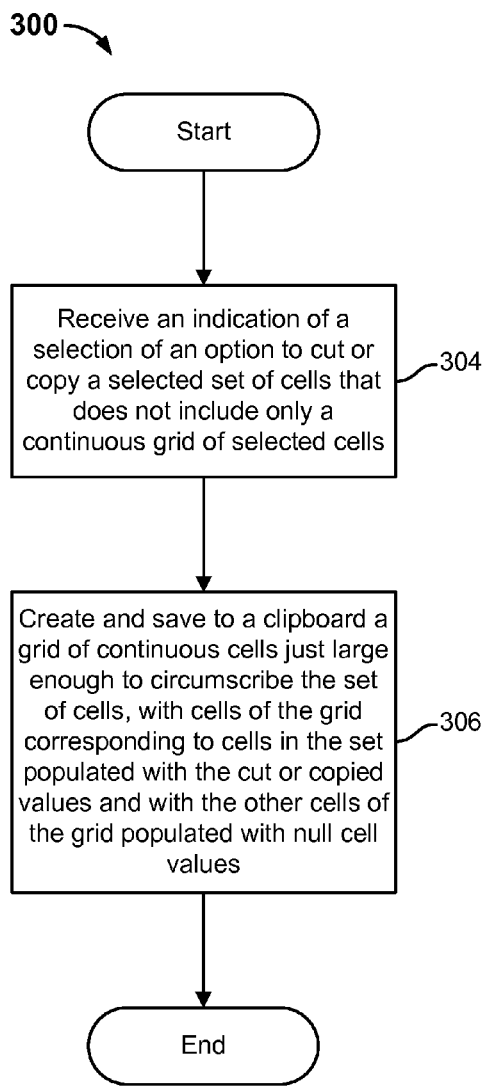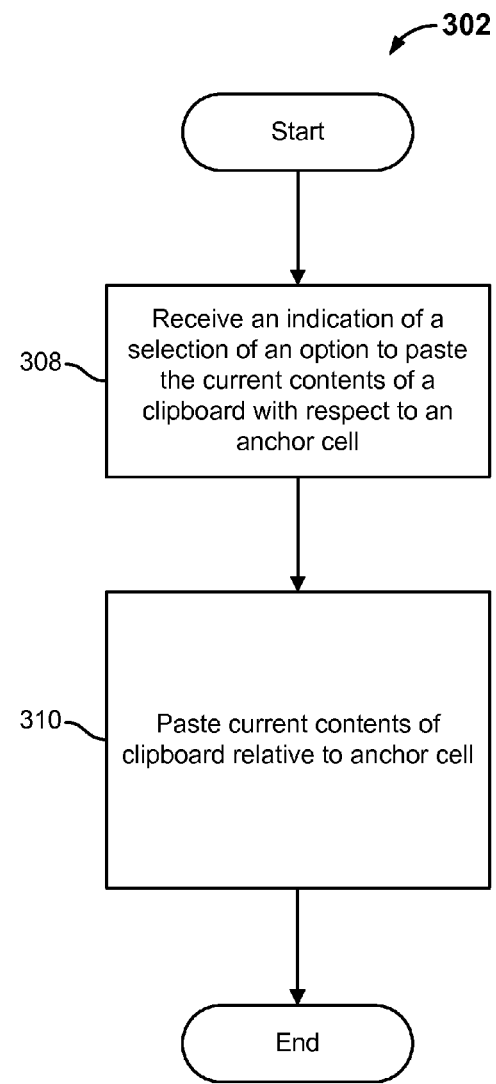
FIG. 3A
FIG. 3B

Airports — 402

|   | A | B | C |
|---|---|---|---|
| 1 | BOS | HNL | DEN |
| 2 | JFK | LAX | LAS |
| 3 | ORD | SLC | MIA |
| 4 | SJC | DFW | SFO |
| 5 | PHX | LGA |  |
| 6 | MSP |  |  |

Flights — 404

|   | A | B | C | D |
|---|---|---|---|---|
| 1 | 10 | 19 | 16 | 13 |
| 2 | 17 | 31 | 28 | 15 |
| 3 | 16 | 25 | 19 | 33 |
| 4 | 27 | 13 | 38 | 20 |
| 5 | 35 | 34 | 22 | 40 |
| 6 | 22 | 12 | 36 | 17 |
| 7 | 24 | 39 | 15 | 31 |
| 8 | 11 | 21 | 26 | 18 |

FIG. 4A

Airports — 402

|   | A | B | C |
|---|---|---|---|
| 1 | BOS | HNL | DEN |
| 2 | JFK | LAX | LAS |
| 3 | ORD | SLC | MIA |
| 4 | SJC | DFW | SFO |
| 5 | PHX | LGA |  |
| 6 | MSP |  |  |

Cut
Copy
Paste

Flights — 404

|   | A | B | C | D |
|---|---|---|---|---|
| 1 | 10 | 19 | 16 | 13 |
| 2 | 17 | 31 | 28 | 15 |
| 3 | 16 | 25 | 19 | 33 |
| 4 | 27 | 13 | 38 | 20 |
| 5 | 35 | 34 | 22 | 40 |
| 6 | 22 | 12 | 36 | 17 |
| 7 | 24 | 39 | 15 | 31 |
| 8 | 11 | 21 | 26 | 18 |

FIG. 4B

PASTING A SET OF CELLS

CROSS REFERENCE TO OTHER APPLICATIONS

This application is a continuation of co-pending U.S. patent application Ser. No. 11/890,652, entitled CUTTING AND COPYING DISCONTIGUOUS SELECTIONS OF CELLS, filed Aug. 6, 2007, which is incorporated herein by reference for all purposes.

BACKGROUND OF THE INVENTION

In typical spreadsheets and tables, a paste operation is not permitted if the paste destination is not large enough to accommodate the paste operation.

BRIEF DESCRIPTION OF THE DRAWINGS

Various embodiments of the invention are disclosed in the following detailed description and the accompanying drawings.

FIG. 1C illustrates the selection of an option to paste.
FIG. 1D illustrates the result of a paste operation.
FIG. 2A illustrates an embodiment of a process for cutting or copying a set of cells.
FIG. 2B illustrates an embodiment of a process for pasting a set of cells relative to an anchor point.
FIG. 3A illustrates an embodiment of a process for cutting or copying a set of cells.
FIG. 3B illustrates an embodiment of a process for pasting a set of cells relative to an anchor point.
FIG. 4A illustrates the selection of a set of cells.
FIG. 4B illustrates the selection of an option to copy.

DETAILED DESCRIPTION

Figure 1A:
FIG. 1A illustrates the selection of a set of cells.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Cutting and copying discontiguous selections of cells is disclosed. In some embodiments, in response to receiving an indication of a selection of a set of cells that does not include only a continuous grid of selected cells and receiving an indication of a selection of a paste destination in which the set of cells is desired to be pasted, the set of cells is pasted in the paste destination in a manner that preserves a respective relative position of each cell in the set. In some embodiments, if a paste destination is not large enough to accommodate a paste operation, the paste destination is automatically expanded so that it is large enough to accommodate the paste operation.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "anchor cell" refers to a cell relative to which a paste operation is performed, e.g., the cell selected when a paste operation is selected or the cell over which a cursor is positioned when a "drop" input, such as releasing a mouse or other input device button, is received in connection with a drag-and-drop operation. In some embodiments, cells in a spreadsheet application are organized into one or more individual tables or table objects, each of which includes a desired number of rows and columns of cells. In such cases, a sheet of a spreadsheet document may include a desired number of table objects. Although in many of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

In some embodiments, as disclosed herein, options to cut and/or copy are available for and can be used with respect to arbitrarily complex selections of cells, including without limitation a group of selected cells that does not comprise only a continuous grid of selected cells. Such a selection of cells that is cut or copied in some embodiments can be non-destructively pasted relative to a selected anchor cell or point in a manner that preserves the relative geometry or positions of the cells. The pasting is non-destructive in the sense that at the destination sheet or table only those cells corresponding to the cells selected in the source sheet or table are overwritten and/or created and written, as applicable. As used herein, the term "discontiguous" when used in connection with a set of selected cells refers to a set of cells that does not include only a continuous grid of selected cells. A continuous grid of selected cells is one that includes all cells in a grid of M continuous rows by N continuous columns, and no others.

Figure 1B:
FIG. 1B illustrates the selection of an option to cut.

FIGS. 1A-1D illustrate an embodiment of an operation in which an arbitrary set of cells not comprising only a continuous grid of selected cells is cut and pasted. FIG. 1A illustrates the selection of a set of cells comprising cells A1, B2, and C3. FIG. 1B illustrates the selection of an option to cut the selected set of cells. FIG. 1C illustrates the selection of an option to paste the current contents of a clipboard (i.e. the set of cells selected and cut in FIGS. 1A-1B) relative to a selected anchor cell A7. FIG. 1D illustrates the result of the cut and paste operations. Although cutting and pasting a set of cells that does not include only a continuous grid of selected cells is depicted in the example of FIGS. 1A-1D, a set of cells can be similarly copied and pasted.

FIG. 2A illustrates an embodiment of a process for cutting or copying a set of cells. In some embodiments, process 200 is employed with respect to FIG. 1B and FIGS. 4B-4C. Process 200 starts at 204 at which an indication of a selection of an option to cut or copy a selected set of cells that does not include only a continuous grid of selected cells is received. At 206, the set of cells is saved to a clipboard, pasteboard, or other memory location associated with cut, copy, and paste operations, and process 200 ends. FIG. 2B illustrates an embodiment of a process for pasting a set of cells relative to an anchor point. In some embodiments, process 202 is employed to paste a set of cells cut or copied using process 200. In some embodiments, process 202 is employed with respect to FIGS. 1C-1D, FIGS. 4D-4E, and FIGS. 4F-4G. Process 202 starts at 208 at which an indication of a selection of an option to paste the current contents of a clipboard is received relative to a selected anchor cell or point with respect to which the paste operation is desired to be performed. At 210, the current contents of the clipboard are pasted relative to the anchor cell, and process 202 ends. In some embodiments, in the cases in which processes 200 and 202 are employed for cut and paste operations, 210 includes deleting the values of the cut cells when pasting. Alternatively, in some embodiments, the values of the cut cells are deleted when an option to cut is selected, e.g., at step 204.

In some embodiments, when cutting or copying a selected set of cells that does not include only a continuous grid of selected cells, a grid of continuous cells just large enough to circumscribe or encompass all cells in the set is saved to a clipboard so that the correct geometry and/or relative positions of the cells in the set can be maintained during the cut or copy and paste operations. In such cases, cells of the grid corresponding to cells included in the set are populated with the actual cut or copied values. The actual cut or copied value of a cell included in the set could be no value, in the case of a blank cell in which no data has been entered. Each of the other cells of the grid that does not correspond to a cell included in the set is, in some embodiments, populated with an object or value that indicates a null cell. Such null objects or values are ignored during a paste operation so that the values of corresponding cells in the paste destination can be preserved (i.e. are not overwritten during the paste operation). When a paste option is selected relative to an anchor cell, the grid of cells saved to the clipboard is pasted relative to the anchor cell, in some embodiments, with the top left cell of the grid coinciding with the anchor cell. In some embodiments, a cell other than the top left-most cell of the grid that circumscribes the selected cells may serve as the anchor cell, such as the top-most and/or left-most selected cell in the set. When the grid is pasted, the actual cut or copied values included in cells of the grid that are not populated with null values or objects are copied to corresponding destination cells, overwriting existing values in the destination cells, while null cell values or objects are ignored so that values in corresponding destination cells are not overwritten. With respect to the example of FIGS. 1A-1D, for instance, the selection of an option to cut the set of discontiguous cells A1, B2, and C3 in FIG. 1B results in a 3×3 grid that encompasses cells A1, A2, A3, B1, B2, B3, C1, C2, and C3 to be saved to the clipboard. The actual values of cells A1, B2, and C3 are used to populate corresponding cells in the grid, but null cell values are used to populate the other cells (i.e. A2, A3, B1, B3, C1, and C2) in the grid. When an option to paste is selected with respect to anchor cell A7 in FIG. 1C, the grid of cells is pasted relative to anchor cell A7, with the top left cell of the grid (corresponding to cell A1) coinciding with anchor cell A7.

FIG. 3A illustrates an embodiment of a process for cutting or copying a set of cells. In some embodiments, process 300 is employed with respect to FIG. 1B and FIGS. 4B-4C. Process 300 starts at 304 at which an indication of a selection of an option to cut or copy a selected set of cells that does not include only a continuous grid of selected cells is received. At 306, a grid of continuous cells that is just large enough to circumscribe or encompass the set of cells of 304 is created and saved to a clipboard, with cells of the grid corresponding to cells in the set populated with the cut or copied values and with the other cells of the grid populated with null cell values or objects. In some embodiments, the dimensions of the grid are based on the dimensions encompassed by the set of cells. In some embodiments, the top left cell of the grid is determined by the top-most row and left-most column associated with cells in the set, and the bottom right cell of the grid is determined by the bottom-most row and right-most column associated with cells in the set. FIG. 3B illustrates an embodiment of a process for pasting a set of cells relative to an anchor point. In some embodiments, process 302 is employed with respect to FIGS. 1C-1D, FIGS. 4D-4E, and FIGS. 4F-4G. In some embodiments, process 302 is employed to paste the set of cells cut or copied using process 300. Process 302 starts at 308 at which an indication of a selection of an option to paste the current contents of a clipboard (e.g., the grid of cells of 306) is received relative to a selected anchor cell or point with respect to which the paste operation is desired to be performed. In some embodiments, the anchor cell is a part of a plurality of cells that are selected when the paste option of 308 is selected. In some such cases in which multiple cells are selected when the paste option is selected, the anchor cell comprises the top-most and/or left-most cell of the plurality of selected cells. At 310, the current contents of the clipboard are pasted relative to the anchor cell. For example, the grid of cells saved to the clipboard at 306 is pasted onto a corresponding range of cells relative to the anchor cell, with the top left cell of the grid coinciding with the anchor cell. In some such cases, during the paste operation, the actual cut or copied values included in cells of the grid that are not populated with null values or objects are written to corresponding destination cells while null cell values or objects are ignored during the paste operation, preserving the contents of the associated destination cells.

FIGS. 4A-4G illustrate embodiments in which a set of discontiguous cells is copied from table 402 and pasted into table 404. Although copying and pasting a set of discontiguous cells is depicted in the examples of FIGS. 4A-4G, a set of discontiguous cells can be similarly cut and pasted.

Figure 4C:
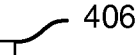
FIG. 4C illustrates an embodiment of a grid saved to a clipboard in response to the selection of an option to copy.
Figure 4D:
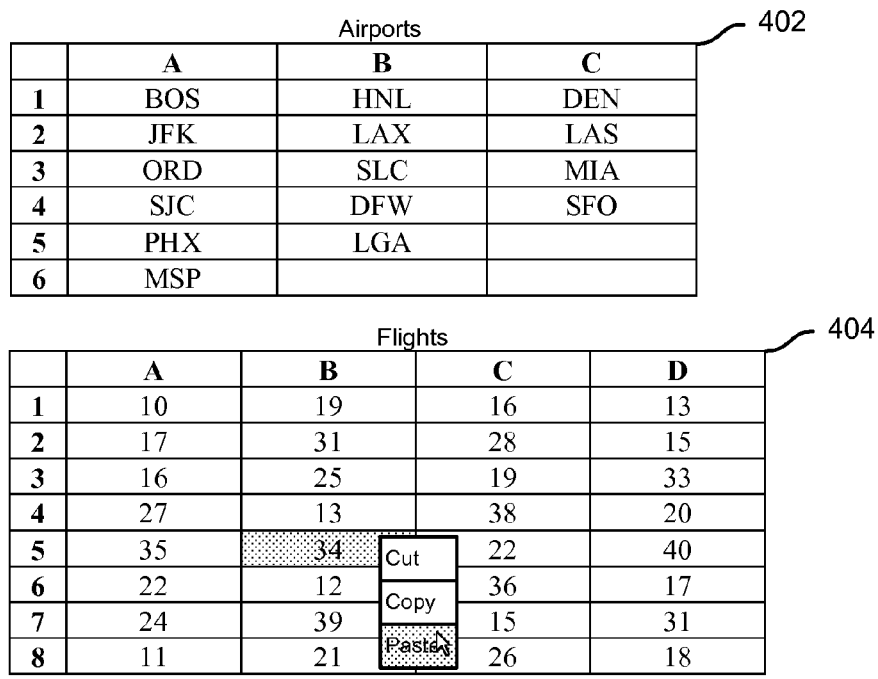
FIG. 4D illustrates the selection of an option to paste.
Figure 4E:
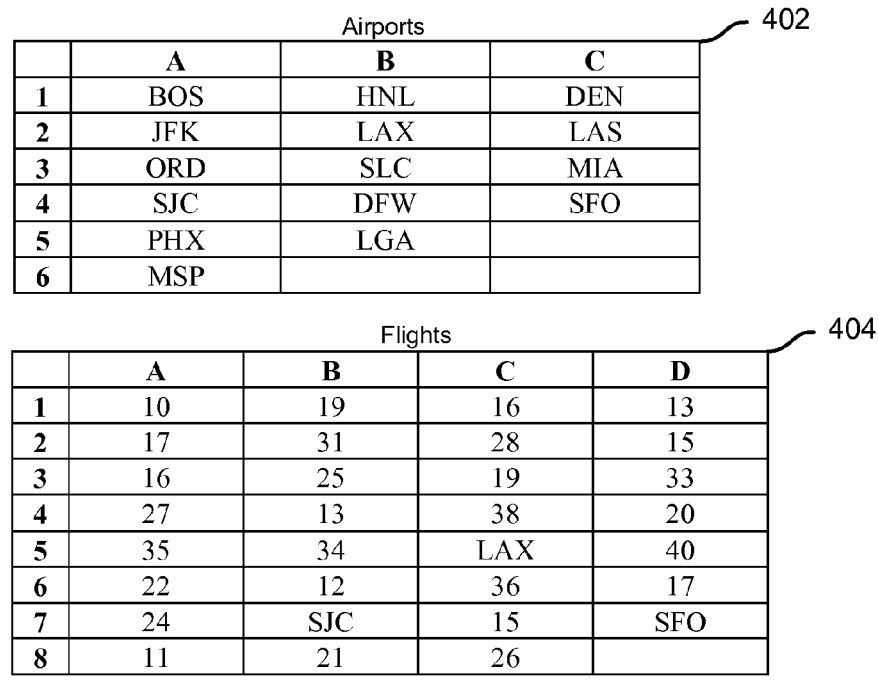
FIG. 4E illustrates the result of a paste operation.

FIG. 4A illustrates the selection of a set of cells of table 402, i.e. cells A4 and B2 and cell range C4:C5. FIG. 4B illustrates the selection of an option to copy the selected set of cells. FIG. 4C illustrates an embodiment of the grid 406 saved to a clipboard in response to the selection of the option to copy the selected set of cells in FIG. 4B. FIG. 4D illustrates the selection of an option to paste the current contents of the clipboard (i.e. grid 406 of FIG. 4C) relative to a selected anchor cell B5 in table 404. FIG. 4E illustrates the result of the paste operation.

Figure 4F:
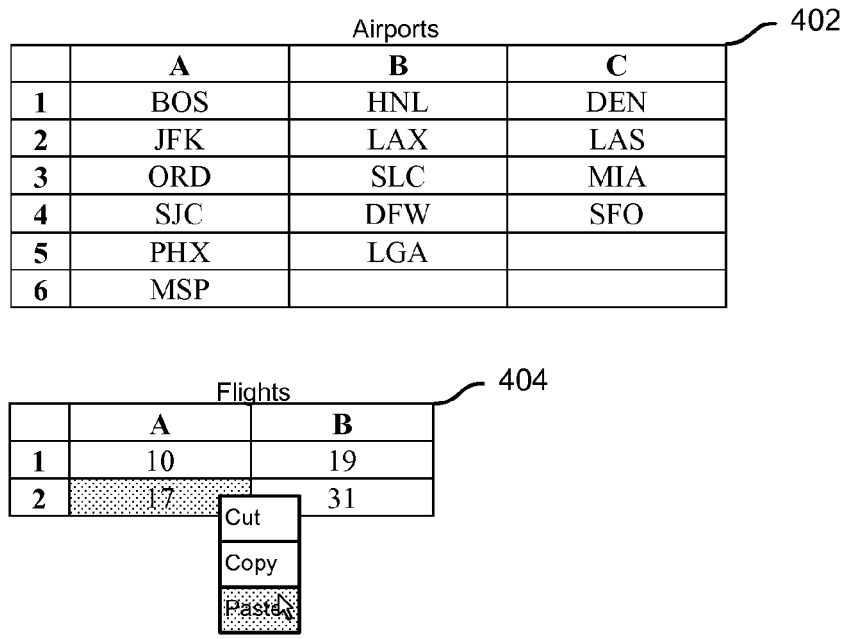
FIG. 4F illustrates the selection of an option to paste.
Figure 4G:
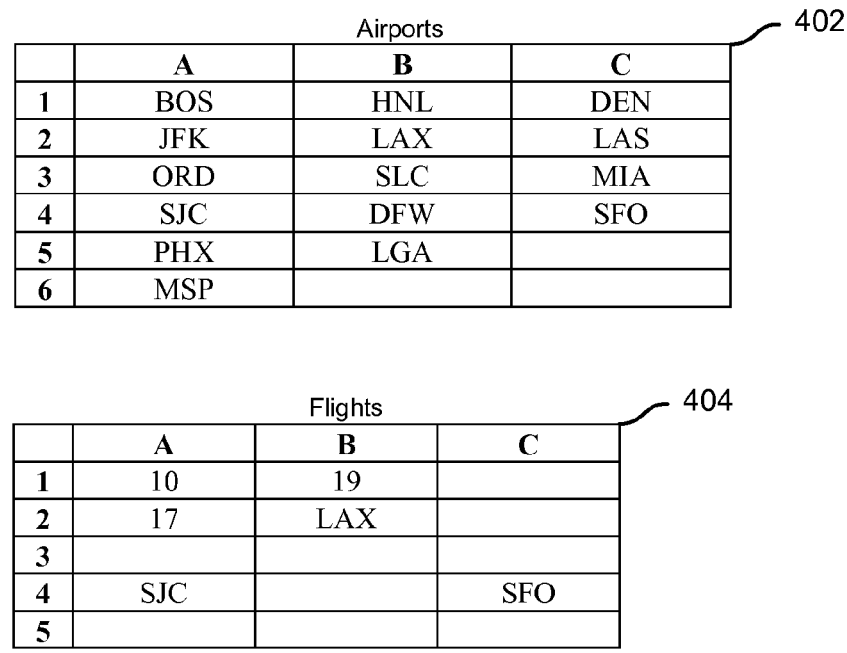
FIG. 4G illustrates the result of a paste operation.

In some embodiments, a paste destination may not be large enough to accommodate the contents of a clipboard during a paste operation. In some such cases, in some embodiments, the paste destination is automatically enlarged or expanded to a size large enough to accommodate the contents of a clipboard during a paste operation. A destination table, for instance, may be automatically expanded by adding additional rows and columns as needed, as illustrated in the example of FIGS. 4F-4G in which because the existing destination table 404 of FIG. 4F is too small to accommodate grid 406 of FIG. 4C during a paste operation, it is automatically expanded in FIG. 4G as needed. Specifically, consider that an option to copy a selected set of cells of table 402 is selected according to FIGS. 4A-4C. In FIG. 4F, an option to paste the current contents of the clipboard (i.e. the grid of FIG. 4C) relative to a selected anchor cell A2 in table 404 is selected. FIG. 4G illustrates the result of the paste operation. As depicted, table 404 of FIG. 4F is expanded as needed as depicted in FIG. 4G to complete the paste operation.

Figure 5:
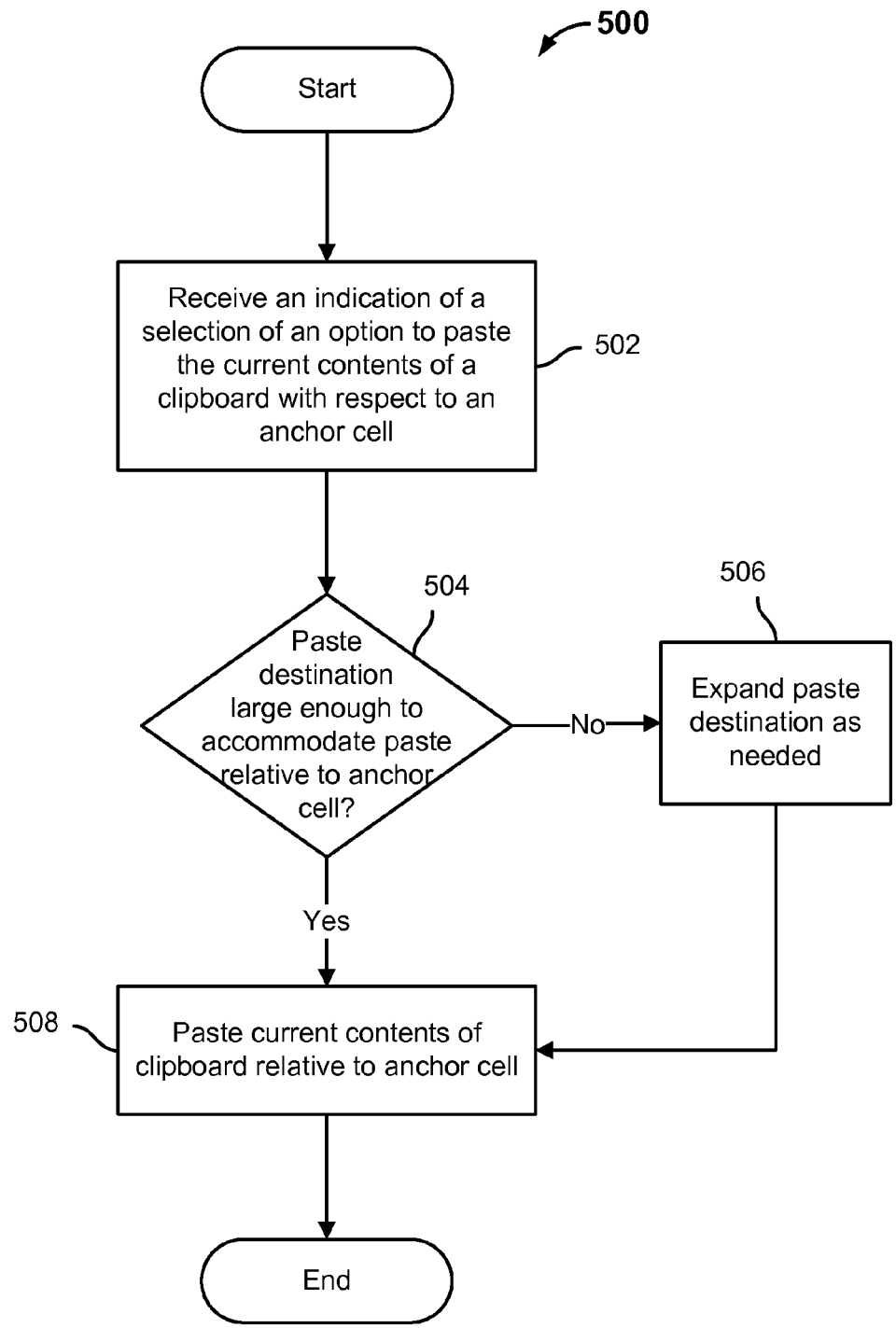
FIG. 5 illustrates an embodiment of a process for automatically expanding a paste destination.

FIG. 5 illustrates an embodiment of a process for automatically expanding a paste destination during a paste operation. In some embodiments, the paste destination comprises a table. In some embodiments, process 500 is employed with respect to FIGS. 4F-4G. Process 500 starts at 502 at which an indication of a selection of an option to paste the current contents of a clipboard with respect to an anchor cell is received. At 504, it is determined whether the paste destination is large enough to accommodate the current contents of the clip board (e.g., a grid of cells such as grid 406 of FIG. 4C) relative to the anchor cell during the paste operation. If it is determined at 504 that the paste destination is not large enough, the paste destination is expanded as need at 506, so that, for example, it is just large enough to accommodate the current contents of the clipboard relative to the anchor cell. In the cases in which the paste destination comprises a table, in some embodiments, 506 includes adding rows and/or columns to the table as needed. If it is determined at 504 that the paste destination is large enough or upon expanding the paste destination as needed at 506, the current contents of the clipboard are pasted relative to the anchor cell at 508, and process 500 ends.

Although described for a set of selected cells that does not include only a continuous grid of selected cells, many of the techniques described herein may be similarly employed with respect to a set of continuous cells. For example, a table or other paste destination may be automatically expanded as described above with respect to FIGS. 4F-4G and process 500 of FIG. 5 to accommodate the pasting of a set of continuous cells relative to an anchor cell if the existing dimensions of the table or paste destination are not adequate to accommodate the paste operation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for pasting, comprising:
   receiving, on an electronic device, a selection of an option to paste a set of cells in a paste destination;
   determining, on the electronic device, that the paste destination does not contain enough cells to accommodate a paste operation associated with the selected option; and
   automatically adding one or more rows of cells, columns of cells, or both to the paste destination using a processor so that the paste destination contains just enough cells to accommodate the paste operation.

2. The method recited in claim 1, further comprising receiving a selection of an option to cut or copy the set of cells.

3. The method recited in claim 1, wherein the selection of the option to paste the set of cells is received with respect to an anchor cell relative to which the set of cells is desired to be pasted.

4. The method recited in claim 1, wherein the paste operation comprises pasting the set of cells in a manner that preserves a respective relative position of each cell in the set.

5. The method recited in claim 1, wherein the set of cells comprises a set of discontiguous cells.

6. The method recited in claim 1, wherein the paste destination comprises a table.

7. The method recited in claim 1, wherein the paste destination comprises at least a portion of a grid of spreadsheet cells.

8. The method recited in claim 1, wherein determining that the paste destination does not contain enough cells to accommodate the paste operation comprises determining that the paste destination does not comprise enough rows of cells, columns of cells, or both to accommodate the paste operation.

9. The method recited in claim 1, further comprising pasting the set of cells in the paste destination after adding the one or more rows of cells, columns of cells, or both.

10. The method recited in claim 1, wherein at least a subset of the set of cells comprises spreadsheet functionality.

11. A system for pasting, comprising:
    a processor configured to:
      receive a selection of an option to paste a set of cells in a paste destination;
      determine that the paste destination does not contain enough cells to accommodate a paste operation associated with the selected option; and
      automatically add one or more rows of cells, columns of cells, or both to the paste destination so that the paste destination contains just enough cells to accommodate the paste operation; and
    a memory coupled to the processor and configured to provide the processor with instructions.

12. The system recited in claim 11, wherein the selection of the option to paste the set of cells is received with respect to an anchor cell relative to which the set of cells is desired to be pasted.

13. The system recited in claim 11, wherein the paste operation comprises pasting the set of cells in a manner that preserves a respective relative position of each cell in the set.

14. A computer program product for pasting, the computer program product being embodied in a tangible, non-transitory, computer readable storage medium and comprising computer instructions for:

receiving a selection of an option to paste a set of cells in a paste destination;

determining that the paste destination does not contain enough cells to accommodate a paste operation associated with the selected option; and automatically adding one or more rows of cells, columns of cells, or both to the paste destination so that the paste destination contains just enough cells to accommodate the paste operation.

15. The computer program product recited in claim 14, wherein the selection of the option to paste the set of cells is received with respect to an anchor cell relative to which the set of cells is desired to be pasted.

16. The computer program product recited in claim 14, wherein the paste operation comprises pasting the set of cells in a manner that preserves a respective relative position of each cell in the set.

17. The computer program product recited in claim 14, wherein automatically adding one or more rows of cells, columns of cells, or both to the paste destination comprises adding one or more rows of cells, columns of cells, or both to the paste destination.

\* \* \* \* \*